United States Patent [19]

Robichaud et al.

[11] Patent Number: 4,473,471
[45] Date of Patent: Sep. 25, 1984

[54] FILTER SEALING GASKET WITH REINFORCEMENT RING

[75] Inventors: Arthur W. Robichaud, Atlantic Highlands; Charles G. Pickett, N. Plainfield; John G. Charney, Colonia; Richard McGillick, Garwood, all of N.J.

[73] Assignee: Purolator Inc., New Brunswick, N.J.

[21] Appl. No.: 460,626

[22] Filed: Jan. 24, 1983

Related U.S. Application Data

[63] Continuation-in-part of Ser. No. 417,654, Sep. 13, 1982, abandoned.

[51] Int. Cl.³ .............................................. B01D 27/10
[52] U.S. Cl. .................................... 210/443; 210/450; 210/DIG. 17; 277/188 A
[58] Field of Search ...................... 210/196, 416.1, 445, 210/167, 168, DIG. 17, 416.5, 323, 443, 444, 450; D23/47; 277/12, 32, 166, 188 A; 251/358

[56] References Cited

U.S. PATENT DOCUMENTS

| | | | |
|---|---|---|---|
| 3,064,984 | 11/1962 | Mickle et al. | D23/47 |
| 3,353,680 | 11/1967 | Niebergall | 210/440 |
| 3,537,711 | 11/1970 | Walker | 277/12 |
| 3,557,963 | 1/1971 | Offer | 210/450 |
| 3,930,657 | 1/1976 | Svensson et al. | 277/188 A |
| 4,040,636 | 8/1977 | Albertson et al. | 277/188 A |
| 4,168,237 | 9/1979 | Pickett et al. | 210/DIG. 17 |
| 4,201,392 | 5/1980 | Watts | 277/188 A |
| 4,239,242 | 12/1980 | Burns | 277/166 |
| 4,345,739 | 8/1982 | Wheatley | 277/166 |
| 4,368,894 | 1/1983 | Parmann | 277/166 |

Primary Examiner—Richard V. Fisher
Assistant Examiner—Wanda L. Millard
Attorney, Agent, or Firm—Staas & Halsey

[57] ABSTRACT

A fluid sealing gasket device for a spin-on, throwaway filter having an annular sealing gasket with a groove of a particular shape in cross-section, the groove being formed circumferentially at the outer peripheral wall thereof; a substantially correspondingly shaped annular, metal reinforcing member positioned in and extending from the correspondingly shaped groove; and an annular gasket retaining channel formed in the filter end plate for retaining the reinforced sealing gasket therein. The gasket has a lower portion positioned in the retainer channel and an upper portion extending therefrom, with the annular groove and reinforcing member located in the upper portion of the gasket. Alternatively, the reinforcing member effectively fills a "void" when the gasket is molded therearound. This fluid sealing gasket device retains the gasket's structural integrity upon installation on the filter mount and during use when high fluid pressures are exerted on the gasket from the inside of the filter. Thus this reinforced fluid sealing gasket device minimizes deformation, improper orientation, and improper displacement of the gasket during installation and use of the filter, thereby assuring that the gasket is fully effective for sealing the filter to the filter mount and preventing leakage of the fluid.

24 Claims, 11 Drawing Figures

FILTER SEALING GASKET WITH REINFORCEMENT RING

CROSS REFERENCES TO RELATED APPLICATIONS

This is a Continuation-in-Part of U.S. application Ser. No. 417,654, filed Sept. 13, 1982, now abandoned.

BACKGROUND OF THE INVENTION

This invention relates to a fluid filter sealing device and, more particularly, to a sealing gasket device for a fluid filter of the spin-on, throw-away type.

The spin-on, throw-away type of fluid filter is now commonly used as the oil filter for motor vehicles because this filter is inexpensive to mass produce and easy to install and replace. This fluid filter typically has an open end with a threaded aperture and is spun onto a threaded stud of a filter mount on the engine block or the like. An annular sealing gasket is retained at the open end of the fluid filter by a retainer channel for providing a fluid seal between the filter and the filter mount, thereby preventing fluid leakage therebetween. An example of a spin-on, throw-away type filter is disclosed in U.S. Pat. No. 4,168,237, issued to Pickett et al., which is commonly assigned to the assignee of the present invention.

One of the common and continuing problems of the known type of spin-on oil filters and related sealing gasket devices is ensuring an effective fluid seal between the filter and the engine block or filter mount. The conventional spin-on filter employs a solid, squarely shaped, resilient annular sealing gasket which is positioned in an annular retainer channel formed in an end plate of the filter.

When the spin-on filter is attached to the filter mount, friction, twisting, and compressive forces act on the sealing gasket between the end plate of the filter and the filter mount. These forces put great strains on the annular sealing gasket. The gasket can become deformed or can be caused to lie "off-center" of the retainer channel.

Once the filter is installed on the filter mount, fluid circulated through the filter also exerts a great amount of pressure against the sealing gasket. More particularly, the fluid passing through the filter exerts a high pressure force radially outwardly against the inside peripheral wall of the gasket. This pressure can cause deformation of the gasket and subsequent leakage of the fluid around the gasket. The spin-on filter sealing gasket leakage problems from high fluid pressures is acute because at the upper portion of the sealing gasket, i.e., between the filter mount and the retainer channel, there is no peripheral support. Thus, the prior art fluid sealing gasket devices display fluid leakage problems because of imperfect sealing by the sealing gasket when the filter is installed and used on the engine block or filter mount.

The basic reason these prior art gaskets leak is because they lack the ability to effectively control the forces at installation and the outward high pressure exerted by the fluid while the filter is in use.

Thus, it can be seen that the known prior art sealing gasket devices for spin-on, throw-away type oil filters continue to have fluid sealing and leakage problems. None of the known prior art devices have the novel features of the invention disclosed herein for eliminating such sealing and leakage problems while maintaining a low-cost, easily mass-produced filter.

SUMMARY OF THE INVENTION

In light of the above-mentioned disadvantages in the prior art fluid filter sealing gasket devices, it is an object of the present invention to provide an improved fluid filter sealing gasket device which provides an extremely effective seal between the filter and the filter mount during both installation and use of the filter.

It is another object of the present invention to provide a fluid sealing gasket device for a spin-on, throw-away type fluid filter, which minimizes sealing gasket deformation during both installation and use of the filter, and which provides an extremely effective seal between the filter and filter mount during both spin-on installation and use of the filter.

It is yet another object of the present invention to provide a fluid sealing gasket device wherein the sealing gasket retains its structural integrity to remain properly oriented between the filter and the filter mount, thus minimizing deformation and improper orientation of the gasket during both installation and use of the filter.

It is still another object of the invention to provide a fluid sealing gasket device which is relatively simple and has minimum structural components, thereby ensuring a low-cost, mass-produced fluid filter.

Finally, it is another object of this invention to provide a fluid sealing gasket device which is easily assembled on the filter, thereby ensuring a low-cost massproduced filter.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of this invention, and as embodied and broadly described herein, the fluid sealing gasket device for a filter assembly comprises a sealing gasket; means positioned in the sealing gasket for reinforcing the sealing gasket against the deliterious affects of fluid pressure; and a gasket retainer channel formed at one end of a filter for retaining the sealing gasket therein. The sealing gasket is a resilient, annular gasket having a groove formed radially inwardly from and circumferentially along the outer peripheral wall of the gasket.

In one embodiment, only part of the annular reinforcing member is positioned within the groove and part extends beyond the groove, whereas in another embodiment, the entire reinforcing member fits within the area defined by the groove. In either embodiment, the part of the reinforcing member positioned in the groove has a shape substantially complimentary to that of the groove, and has dimensions substantially equal to the dimensions of the groove.

Alternatively, the gasket may have an internal "void" instead of a groove for receiving the entire reinforcing member; the void being formed while the gasket, for example, is molded entirely around the reinforcing member. Of course, in this embodiment, the outer shape and dimensions of the ring are almost identical to the shape and dimensions of the void.

The sealing gasket lower portion is positioned in the retainer channel and the upper portion extends therefrom, with the groove or void and the reinforcing member being located in the upper portion of the gasket.

When the reinforced sealing gasket is positioned in the retainer channel and installed on the filter mount, the reinforcing member reinforces the gasket to retain its structural integrity and minimize deformation due to friction, twisting, and compressive forces. In use, while the fluid is flowing through the filter, the reinforcing member reinforces the gasket to prevent deformation of the gasket from the high fluid pressures exerted radially outwardly against the inside portion of the gasket. Thus, the combination of the groove or void and the reinforcing member minimizes the possibility of deformation of or improper orientation of the gasket during either installation or use, and thereby ensures that the gasket is fully effective for sealing the filter to the filter mount and for preventing leakage of fluid therebetween.

DESCRIPTION OF THE PREFERRED EMBODIMENTS

Figure 1:
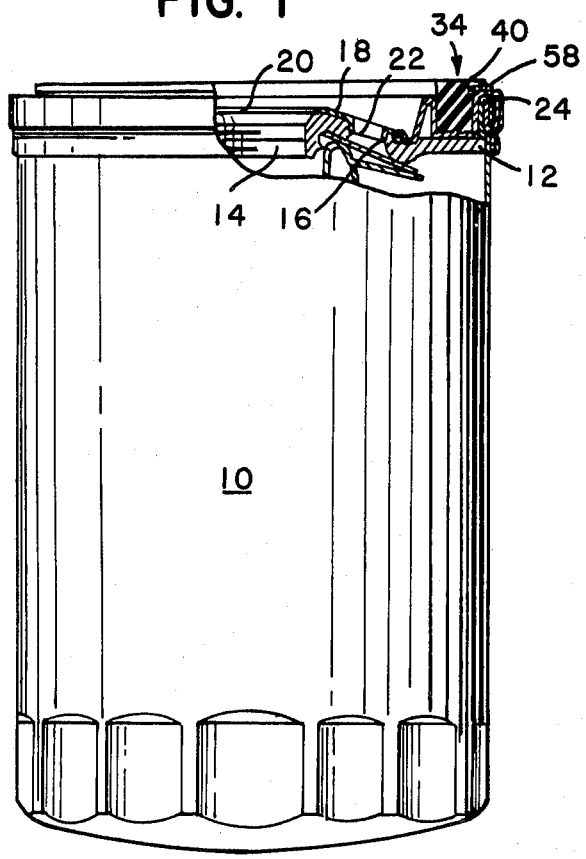
FIG. 1 is a side view of a spin-on, throw-away type oil filter housing, illustrating particularly a cut-away view of the reinforced fluid filter sealing gasket device of the present invention.

Referring to FIG. 1 of the drawings, the reinforced fluid filter sealing gasket device of the present invention is shown incorporated into an oil filter cartridge or housing 10 of the spin-on, throw-away type.

Throughout the description of the preferred embodiments various directional references will be used for convenience: the direction toward the filter mount is "upward;" the direction toward the closed end of the filter housing is "downward"; the direction away from the central axis of the filter housing is "outward"; and the direction toward the central axis of the filter housing is "inward".

The housing 10 is normally provided having internally thereof a filter element (not shown). The usual oil filter housing 10 has the following structure: normally closed at one end and open at the other end; a cover plate 12 substantially closing the open end of the filter housing 10; a threaded central aperture 14 to permit screwing of the filter onto a threaded stud (not shown) normally associated with a filter mount on the engine block or the like with which the filter is used; oil flow holes 16 provided in the cover plate 12 and spaced circumferentially around a threaded central aperture 20 which compliments the threaded central aperture 14 of the cover plate 12; and a corresponding plurality of oil flow holes 22 provided in an end plate 18 complimenting the oil flow holes 16 of the cover plate 12. Both the cover plate 12 and the end plate 18 are assembled on the filter housing 10 substantially perpendicularly to the central axis of the filter housing 10.

Figure 2:
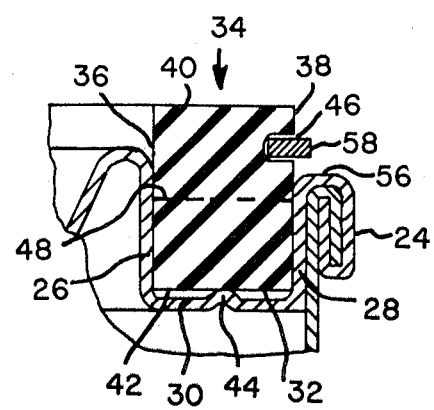
FIG. 2 is an enlarged fragmentary cross-sectional view of the preferred embodiment of the reinforced fluid filter sealing gasket device of the present invention, mounted in the gasket retainer channel of the spin-on, throw-away type filter housing shown in FIG. 1.

As best seen in FIG. 2, the outer circumferential edge of the end plate 18 is normally folded and interleaved or rolled with the outer circumferential edge of the filter housing 10, during manufacture of the filter structure. This folded and interleaved joint or rolled seam 24 provides a fluid pressure-tight connection for the filter interior. The end plate 18 further comprises inner and outer side walls and a bottom wall, 26, 28 and 30, respectively, which together form an annular gasket retainer channel 32 therebetween.

With concurrent reference to FIGS. 1 and 2, the gasket 34 of the fluid filter sealing gasket device of this invention will now be described as incorporated into the spin-on throw-away type filter. The gasket 34 is provided having a generally ring-like or annular configuration and further having an inner peripheral wall 36, an outer peripheral wall 38, an upper substantially flat sealing surface 40, and a bottom substantially flat sealing surface 42. The inner and outer peripheral walls 36 and 38, respectively, of the gasket 34 are generally parallel to each other and in parallel alignment with the central axis of the filter cartridge 10, and thus perpendicular to the sealing surface of the filter mount (not shown). The gasket's upper sealing surface 40 and bottom sealing surface 42 are likewise parallel to each other, the filter cover plate 12 and the filter end plate 18, but are generally perpendicular to the inner and outer walls 36 and 38 of the gasket 34. In sum, the cross-section of the gasket 34 as seen in FIG. 2 is basically rectangular or square to provide an easily manufactured gasket 34 and complimentary retainer channel 32.

As best seen in FIG. 2, the bottom wall 30 forming the retainer channel 32 includes a circumferentially extending annular rib 44. This rib 44 aids in keeping the sealing gasket 34 aligned centrally in the retainer channel 32 as the filter is being spun onto the filter mount. The rib also aids in ensuring a proper seal between the filter and the filter mount.

The gasket member 34 is made of rubber, or rubber-like material, preferably of resilient yet oil and fluid resistant type material, which will compress slightly under pressure, but offers sufficient firmness so as to become firmly seated and form a tight seal at the sealing surfaces of the filter and the filter mount upon spin-on installation of the filter thereto. The gasket preferably has an outer diameter of 2.75 inches.

Figure 3:
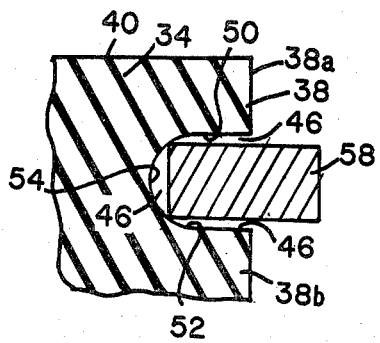
FIG. 3 is an enlarged fragmentary cross-sectional view of the preferred embodiment of the reinforced fluid filter sealing gasket device of the present invention, illustrating particularly a "U"-shaped gasket groove and a substantially corresponding rectangular reinforcing member.

As best seen in FIGS. 1, 2 and 3, according to the preferred embodiment, the annular gasket 34 has a groove 46 extending radially inwardly from and circumferentially along the outer peripheral wall 38. The groove 46 is generally positioned for the preferred embodiment (and most of the other preferred embodiments disclosed herein, as will be described) above the center line 48 of the gasket shown in FIG. 2 in the upper portion of the gasket extending just above the side walls of the retainer channel 32.

The sealing gasket groove 46 can have various shapes as will be described. However, the preferred embodiment of this invention employs a "U"-shaped groove 46 formed in the gasket outer peripheral wall 38 to leave outer peripheral wall portions 38a and 38b adjacent the "U"-shaped groove 46.

In the preferred embodiment, the distance between the upper sealing surface 40 and the bottom sealing surface 42 of the gasket 34 is 0.350 inches. The distance between the upper wall 50 of the groove 46 and the lower wall 52 of the groove 46 is 0.062 inches. The distance between the plane of the gasket outer wall 38 and the inwardmost portion 54 of the groove 46 is 0.070 inches. The distance between the upper sealing surface 40 of the gasket 34 and the upper wall 50 of the groove 46 is 0.050 inches, and, of course, the distance between the upper wall 50 and the lower sealing surface 42 is 0.30 inches. The distance between the lower wall 52 of the groove 46 and the bottom sealing surface 42 of the gasket 34 is 0.238 inches. The distance between the plane of the upwardmost plateau 56 on the end plate folded seam 24 and the upper sealing surface is 0.080 inches, or to the bottom sealing surface 42 of the gasket 34 is 0.270 inches. The distance between the inner wall 36 and the outer wall 38 is 0.180 inches.

Generally, the lengths of the outer peripheral wall portions, 38a and 38b, of the gasket 34 are generally determined by the width of the groove 46. As stated above, in the preferred embodiment, the length of wall portion 38a is 0.050 inches and the length of wall portion 38b is 0.238 inches. In addition the depth of the groove 46 from the gasket outer wall 38 to the inwardmost portion of the groove is partly dependent upon the shape of the reinforcing member used, which reinforcing member will be discussed more fully hereafter.

As can be seen in FIGS. 1-3, the preferred embodiment of the reinforcing member 58 is positioned within the groove 46. The reinforcing member 58 is an annular rigid, e.g., metal, ring with a rectangular cross-section. The cross-sectional height of the reinforcing member 58 is preferably in the range of from 0.010 to 0.060 inches for the various embodiments to be described hereafter. The cross-sectional height of the reinforcing member 58 of the preferred embodiment is 0.030 inch. The cross-sectional width of the reinforcing member 58 in the preferred embodiment is 0.103 inch.

The depth of the groove 46 should coincide with the internal diameter of the reinforcing member 58 by ±0.010 inch. However, in the preferred embodiment, the outer diameter of the reinforcing member 58 is greater than the outer diameter of the gasket. This difference assures that the gasket, once assembled with the reinforcement ring, will be installed correctly in the gasket retainer. Since the reinforcing member extends beyond the gasket, and since the walls of the retainer channel are substantially equal, it would be very difficult for an assembler to incorrectly put the gasket in upside down, i.e., with the ring positioned within the area defined by the retainer channel walls.

The reinforcing member 58 can have various shapes, e.g., a flat, round, semi-circular, triangular, rectangular, square or curved cross-section. However, generally the shape and dimensions of the reinforcing member must substantially correspond to the shape and dimensions of the groove 46, as described herein. The reinforcing member 58 can be constructed from flat stock, bands, tubing or wire. Joining the ends of the annular reinforcing member 58 can be accomplished by known procedures, i.e., butt welding, soldering, brazing, or any other means commonly employed to provide a strong joint. The outer diameter of the reinforcing member is preferably 2.819 inches.

In the embodiment shown in FIGS. 1-3, during assembly of the filter, the reinforcing member 58 is inserted into the gasket 34 such that the reinforcing ring member 58 extends over the gasket wall portion 38a and is received by, or snapped into the "U"-shaped recess 46 of the gasket 34. The position of the reinforcing member 58 relative to the gasket outer peripheral wall 38 is a function of the sealing gasket height (i.e., the distance between the upper sealing surface 40 and the lower sealing surface 42), and the depth of the sealing gasket groove 46. For example, in the preferred embodiment, for a gasket 34 of 0.350 inch height and a retainer channel 32 of 0.270 inch depth, the best results are obtained by forming the groove 46 with the upper wall 50 of 0.050 inch distance from the upper sealing surface 40 of the gasket 34, using a rectangular cross-section reinforcing member 58 of 0.030 inch high and 0.103 inch wide in cross-section and forming the groove 46 of 0.070 inch wide and 0.062 high into the gasket 34. As mentioned above, it is also generally preferred in this embodiment that the reinforcing member 58 be positioned in the gasket upper portion, i.e., above the center line 48 of the gasket 34. This combination increases the ability of the sealing gasket to resist dislodgement from the retainer channel at pressures of from 50 to 75 PSI greater than those for the conventional fluid filter gasket and retainer channel configurations known in the art.

Once the reinforcing member 58 is installed in the gasket 34, the reinforced gasket 34 is inserted into the retainer channel 32 such that the reinforcing member 58 extends above part of the end plate folded seam 24. More particularly, as best seen in FIG. 2, the gasket 34 is positioned within the retainer channel 32 with the gasket inner peripheral wall 36 adjacent the inner side wall 28 of the retainer channel 32, the bottom sealing surface 42 of the gasket 34 abutting the bottom wall 30 of the retainer channel 32, the upper sealing surface 40 of the gasket 34 engaging the sealing surface of the filter mount (not shown) upon installation, and the lower portion of outer peripheral wall 38 of the gasket 34 adjacent the outer side wall 28 of the retainer channel 32.

As the filter is spun onto the filter mount, friction, compressive and twisting forces are exerted by the filter mount and filter end plate 18 upon the gasket 34 in the retainer channel 32, especially in the top portion of the gasket near the upper sealing surface 40. Due to the reinforcing member 58 being located in the gasket groove 46, the gasket 34 is reinforced while being properly oriented within the retainer channel 32 during installation of the filter to the filter mount.

Moreover, the reinforcing member 58 being located in the groove 46 of the sealing gasket 34 also provides means for reinforceably retaining the sealing gasket in the retainer channel during filter use. The reinforcing member 58 and the groove 46 combine to allow the sealing gasket 34 to retain its structural integrity when high pressure from fluid in the interior of the filter is exerted radially outwardly against the inner peripheral wall of the gasket.

Thus, it can be seen this combination minimizes deformation and creates an effective seal between the filter and the filter mount, thus eliminating leakage caused both from adverse forces exerted during filter installation and from high fluid pressure occuring during filter use.

Figure 4:
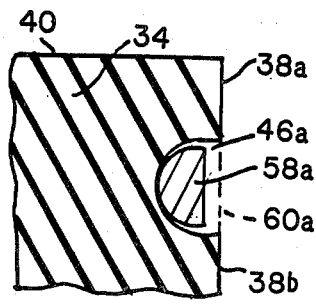
FIG. 4 is an enlarged fragmentary cross-sectional view of another embodiment of the reinforced fluid sealing gasket device of the present invention, illustrating particularly a semicircularly shaped gasket groove and a corresponding semicircularly shaped wire reinforcing member.

FIG. 4 is a view of another embodiment of the reinforced fluid sealing gasket device of the present invention, illustrating particularly a semi-circularly shaped wire reinforcing member 58a in groove 46a.

The reinforcing member 58 of this and the following alternate embodiments does not extend beyond the outer wall of the gasket, but has an outer diameter substantially equal to the outer diameter of the gasket 34.

Figure 5:
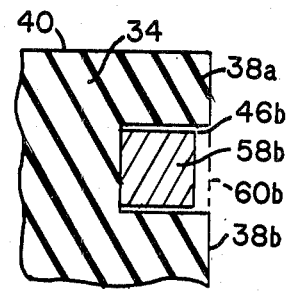
FIG. 5 is an enlarged fragmentary cross-sectional view of another embodiment of the fluid sealing gasket device of the present invention, illustrating particularly a squarely shaped gasket groove and a corresponding squarely shaped wire reinforcing member.

FIG. 5 is a view of another embodiment of the fluid sealing gasket device of the present invention, illustrating particularly a squarely shaped groove 46b and a corresponding squarely shaped wire reinforcing member 58b.

Figure 6:
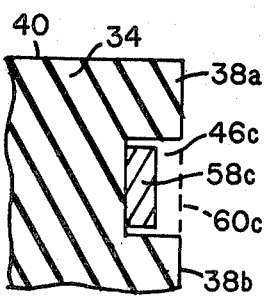
FIG. 6 is an enlarged fragmentary cross-sectional view of another embodiment of the fluid sealing gasket device of the present invention, illustrating particularly a rectangularly shaped gasket groove and a corresponding rectangularly shaped wire reinforcing member.

FIG. 6 is a view of another embodiment of the fluid sealing gasket device of the present invention, illustrating particularly a rectangularly shaped groove 46c and a corresponding rectangularly shaped wire reinforcing member 58c.

Figure 7:
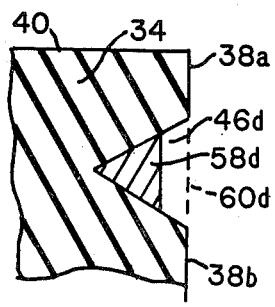
FIG. 7 is an enlarged fragmentary cross-sectional view of another embodiment of the fluid sealing gasket device of the present invention, illustrating particularly a triangularly shaped gasket groove and a corresponding triangularly shaped wire reinforcing member.

FIG. 7 is a view of another embodiment of the fluid sealing gasket device of the present invention, illustrating particularly a "V"-shaped groove 46d and a corresponding triangularly shaped wire reinforcing member 58d.

Figure 8:
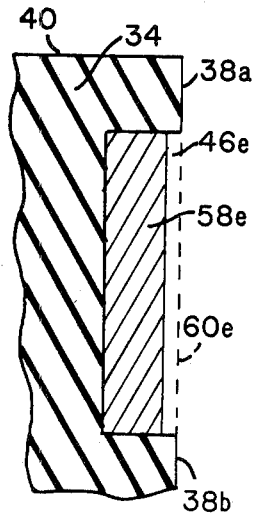
FIG. 8 is an enlarged fragmentary cross-sectional view of another embodiment of the fluid sealing gasket device of the present invention, illustrating particularly a rectangularly shaped gasket groove and a corresponding rectangularly shaped band reinforcing member.

FIG. 8 is a view of another embodiment of the fluid sealing gasket device of the present invention, illustrating particularly a rectangularly shaped groove 46e and a corresponding rectangularly shaped band reinforcing member 58e.

Figure 9:
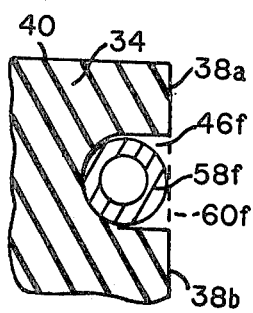
FIG. 9 is an enlarged fragmentary cross-sectional view of another embodiment of the fluid sealing gasket device of the present invention, illustrating particularly a "U"-shaped gasket groove and a corresponding circularly shaped wire or tube reinforcing member.

FIG. 9 is a view of another embodiment of the fluid sealing gasket device of the present invention, illustrating particularly a "U"-shaped groove 46f and a corresponding circularly shaped wire or tube reinforcing member 58f.

Figure 10:
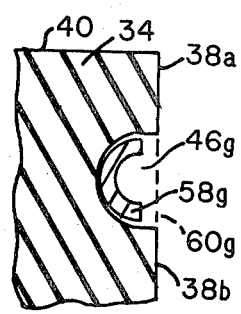
FIG. 10 is an enlarged fragmentary cross-section view of another embodiment of the fluid sealing gasket device of the present invention, illustrating particularly a semicircularly shaped gasket groove and a corresponding semicircularly shaped band reinforcing member.

FIG. 10 is a view of another embodiment of the fluid sealing gasket device of the present invention, illustrating particularly a semi-circularly shaped groove 46g and a corresponding semi-circularly shaped band reinforcing member 58g.

In each of the embodiments taught by this invention, except the rectangular band embodiment illustrated in FIG. 8, i.e., reference numeral 58e, the reinforcing member 58 is positioned in the upper portion of the gasket, i.e., above the center line 48 (FIG. 2) of the gasket 34. However, it can be seen that even in the FIG. 8 embodiment, the reinforcing member 58 is still located in the upper portion of the gasket but extends downwardly into the lower portion of the gasket below the top 56 of the retainer channel side wall.

Figure 11:
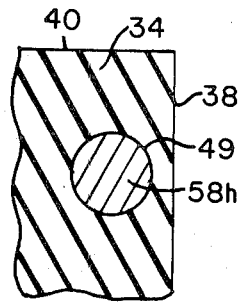
FIG. 11 is an enlarged fragmentary cross-sectional view of another embodiment of the fluid sealing gasket device of the present invention, illustrating particularly the manner in which a reinforcing member fills a void produced by a gasket formed therearound.

Alternatively, as illustrated specifically in FIG. 11, there may be provided a "void" 49 instead of the groove 46. Thus, instead of the reinforcing member 58 being assembled into the groove 46 as in the above-described embodiments, the "void" would be formed when a gasket 34 is molded around the reinforcing member 58 during manufacture. In these alternate embodiments, each respective reinforcing member would be positioned at substantially the same location as described above in relation to FIGS. 4–10. Accordingly, as seen in FIGS. 4–10, phantom lines 60 a–g are used to represent a solid outer wall 38 formed when the gasket is molded around the reinforcing member 58h to form the void. Besides the fact that the gasket 34 surrounds the reinforcing member 58h for such alternative embodiments, the other features of the invention as described above for the "groove" embodiments are substantially the same.

The reinforcement of the gasket 34 using any of the above-described embodiments avoids deformation of the gasket 34, especially at the upper sealing surface 40 near the filter mount and ensures proper alignment of the gasket 34 in the retainer channel 32. This is in contrast to the effects produced by the fluid sealing gasket devices for spin-on, throw-away filters employed in the prior art, wherein a solid, unreinforced gasket may not retain its structural integrity at installation and under high fluid pressures during use. The gaskets in the prior art devices have no peripheral reinforcing members, and have a resilient structure which can deform under the various adverse pressures exerted upon them.

The foregoing description of the preferred embodiments is considered as illustrative only of the principles of the invention. Further, since numerous modifications and changes will readily occur to those skilled in the art by this description, it is not desired to limit the invention to the exact construction and operation shown and described. Accordingly, all suitable modifications may be resorted to, falling within the scope of the invention as set forth in the claims and the equivalents thereto. For example, although the preferred embodiment of this reinforced fluid sealing gasket device emphasizes that the gasket groove and reinforcing member should be located in the outer peripheral wall of the sealing gasket, the invention also encompasses location of the groove and reinforcement member in the inner peripheral wall of the sealing gasket.

We claim:

1. A fluid sealing gasket device for a filter assembly operating under fluid pressure, comprising:
    (a) an annular sealing gasket having top and bottom sealing walls and inner and outer peripheral walls;
    (b) gasket retainer means for retaining the sealing gasket, wherein the gasket has a lower portion positioned in the retainer means and an upper portion extending therefrom; and
    (c) means positioned substantially in said upper portion of the sealing gasket along one of said peripheral walls for reinforcing the sealing gasket against deformation while under fluid pressure.

2. The fluid sealing gasket device of claim 1, wherein the annular sealing gasket has a groove formed radially from and extending circumferentially along one of the peripheral walls of the sealing gasket, and wherein the reinforcing means comprises an annular reinforcing member positioned in said groove.

3. The fluid sealing gasket device of claim 2, wherein the inward dimensions of the groove in the sealing gasket and the corresponding inward dimensions of the reinforcing member are substantially equal.

4. The fluid sealing gasket device of claim 2 or 3, wherein the groove of the sealing gasket is selected from the group which is "U"-shaped, semi-circularly shaped, squarely shaped, rectangularly shaped, or "V"-shaped in cross-section.

5. The fluid sealing gasket device of claim 4, wherein the annular reinforcing member is selected from the group which is circularly shaped, semi-circularly shaped, squarely shaped, rectangularly shaped, or triangularly shaped in cross section.

6. The fluid sealing gasket of claim 5, wherein the annular reinforcing member is metal.

7. The fluid sealing gasket of claim 5, wherein the annular reinforcing member and the groove have dimensions such that the reinforcing member does not extend beyond the peripheral wall of said sealing gasket.

8. The fluid sealing gasket of claim 5, wherein the annular reinforcing member and the groove have dimensions such that the reinforcing member extends beyond the peripheral wall of said sealing gasket.

9. The fluid sealing gasket device of claim 4, wherein the groove is formed radially inwardly from and extends circumferentially along the outer peripheral wall of the gasket.

10. The fluid sealing gasket device of claim 9, wherein the groove is formed in a gasket peripheral wall in the gasket upper portion extending from the gasket retainer means.

11. The fluid sealing gasket device of claim 1, wherein the annular sealing gasket comprises a void formed radially and circumferentially in the sealing gasket, and wherein the means for reinforcing the sealing gasket includes an annular reinforcing member located in said void.

12. The fluid sealing gasket device of claim 11, wherein the void of the sealing gasket is selected from the group which is circularly shaped, semi-circularly shaped, squarely shaped, rectangularly shaped, or triangularly shaped in cross-section.

13. The fluid sealing gasket device of claim 12, wherein the annular reinforcing member is selected from the group which is circularly shaped, semi-circularly shaped, squarely shaped, rectangularly shaped or triangularly shaped in cross-section.

14. The fluid sealing gasket device of claim 13, wherein the void is formed in the gasket upper portion extending from the gasket retainer means.

15. The fluid sealing gasket of claim 13, wherein the annular reinforcing member is metal.

16. The fluid sealing gasket of claim 2 or 13, wherein the annular reinforcing member and the groove have dimensions such that the reinforcing member does not extend beyond the peripheral wall of said sealing gasket.

17. The fluid sealing gasket of claim 2 or 13, wherein the annular reinforcing member and the groove have dimensions such that the reinforcing member extends beyond the peripheral wall of said sealing gasket.

18. The fluid sealing gasket device of claim 12, wherein the filter assembly is a spin-on, throw-away filter assembly, and wherein said gasket retainer means comprises a retainer member having side and bottom walls for defining an annular retainer channel formed in one end of said spin-on, throw-away filter, and wherein the lower portion of the gasket is positioned therein.

19. The fluid sealing gasket device of claim 11, wherein the overall dimensions of the void in the sealing gasket and the overall dimensions of the reinforcing member are substantially equal.

20. The fluid sealing gasket device of claim 2 or 11, wherein the annular reinforcing member is selected from the group which is circularly shaped, semi-circularly shaped, squarely shaped, rectangularly shpped, or triangularly shaped in cross-section.

21. A spin-on fluid filter, comprising:
(a) a filter housing;
(b) an end plate attached to an end of the filter housing;
(c) an annular, resilient gasket having top and bottom sealing walls and inner and outer peripheral walls, the outer peripheral wall of the gasket having a groove in the upper portion extending radially inwardly and circumferentially therealong;
(d) an annular gasket retainer member on the end plate having inner and outer side walls and a bottom wall for forming an annular gasket retainer channel, wherein the gasket has a lower portion positioned in the retainer means and an upper portion extending therefrom containing said groove; and
(e) a continuous annular reinforcing member positioned in the groove in the outer peripheral wall of the annular, resilient gasket, wherein part of the reinforcing member extends out of the groove; wherein the bottom sealing wall of the gasket abuts the bottom wall of the retainer channel, the inner side wall of the gasket partially abuts the inner side wall of the retainer channel, the outer side wall of the gasket partially abuts the outer side wall of the retainer channel, and the groove of the gasket with the reinforcing member located therein is positioned in the outer peripheral wall of the gasket above the outer side wall of the retainer channel.

22. The spin-on fluid filter of claim 21, wherein the groove is "U"-shaped in cross-section.

23. The spin-on fluid filter of claim 21, wherein the reinforcement member is rectangular in cross-section.

24. A spin-on fluid filter, comprising:
(a) a filter housing;
(b) an end plate attached to an end of the filter housing;
(c) an annular, resilient gasket having top and bottom sealing walls and inner and outer peripheral walls, the gasket having a void extending circumferentially in an upper portion therein;
(d) an annular gasket retainer member on the end plate having inner and outer side walls and a bottom wall for forming an annular gasket retainer channel wherein the gasket has a lower portion positioned in the retainer means and an upper portion extending therefrom containing said void; and (e) a continuous, annular reinforcing member positioned in the void in the annular, resilient gasket; wherein the bottom sealing wall of the gasket abuts the bottom wall of the retainer channel, the inner side wall of the gasket partially abuts the inner side wall of the retainer channel, the outer side wall of the gasket partially abuts the outer side wall of the retainer channel, and the void of the gasket with the reinforcing member located therein is positioned above the outer side wall of the retainer channel.

* * * * *